P. E. VINEYARD.
ACCELERATING FOOT THROTTLE FOR USE ON AUTOMOBILE ENGINES.
APPLICATION FILED AUG. 30, 1917.
1,274,823.
Patented Aug. 6, 1918.
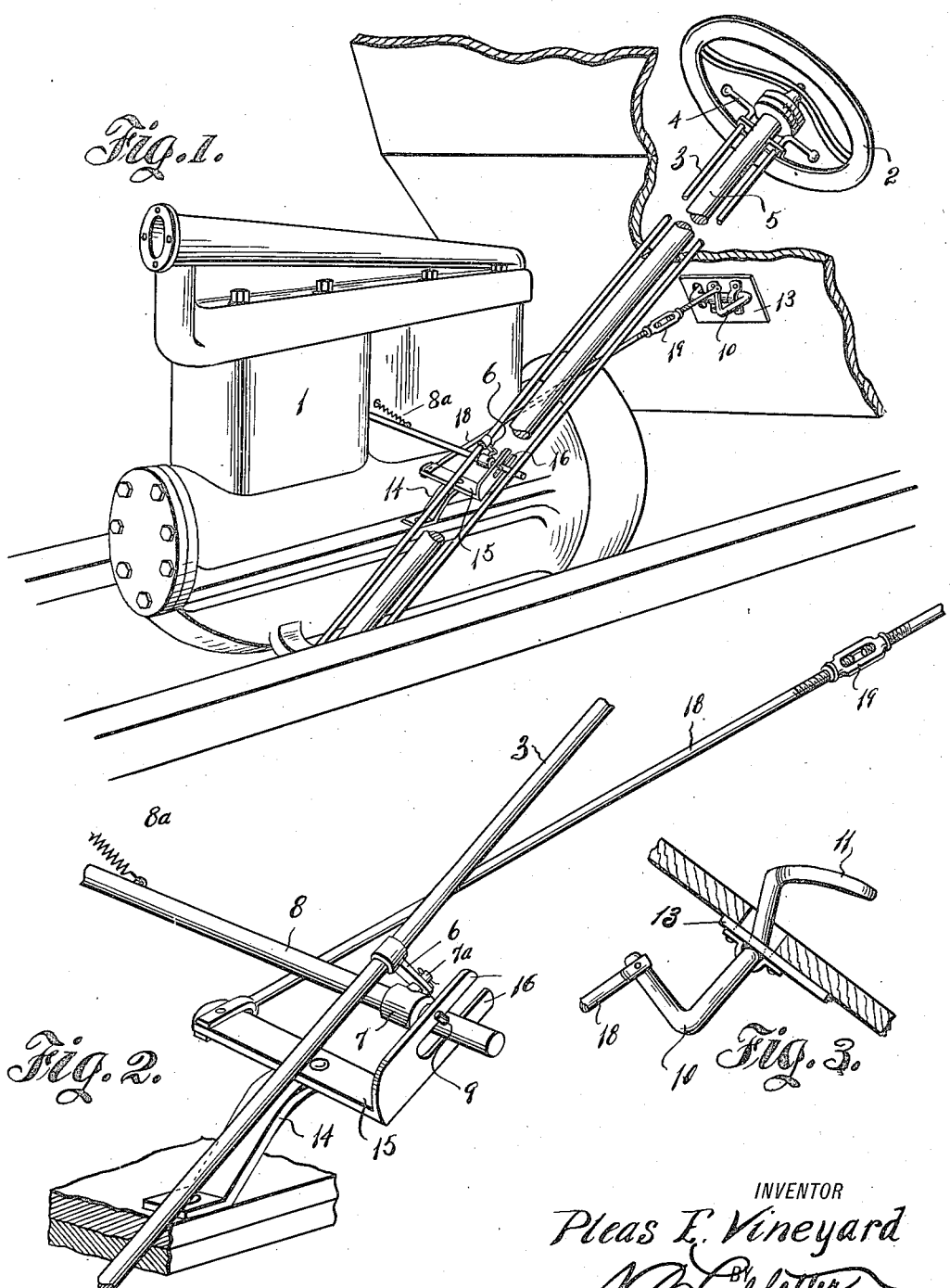
INVENTOR
Pleas E. Vineyard
ATTORNEY

UNITED STATES PATENT OFFICE.

PLEAS E. VINEYARD, OF WINDOM, TEXAS, ASSIGNOR OF ONE-HALF TO ROBERT E. LEE, OF WINDOM, TEXAS.

ACCELERATING FOOT-THROTTLE FOR USE ON AUTOMOBILE-ENGINES.

1,274,823.          Specification of Letters Patent.      Patented Aug. 6, 1918.

Application filed August 30, 1917. Serial No. 188,866.

*To all whom it may concern:*

Be it known that I, PLEAS E. VINEYARD, a citizen of the United States of America, residing at Windom, Fannin county, Texas, have invented new and useful Improvements in Accelerating Foot-Throttles for Use on Automobile-Engines, of which the following is a specification.

This invention relates to a new and useful improved form of foot pedal or foot throttle to be used in connection with the throttle or carbureter control on an automobile engine and provides means for effectively controlling the speed of an engine by the action of the driver's foot against the foot throttle located in a convenient position on the floor of the car.

An object of the invention is to provide a suitably pivoted foot pedal arranged in connection with instrumentalities necessary to exercise a controlling relation over the throttle of the carbureter and to work in an independently conjoined relation with the present form of throttle control on automobiles, and especially in connection with throttle control on the Ford car. With the above and other objects in view the invention has relation to a certain combination and arrangement of parts, an example of which is described in the following specifications, pointed out in the appended claims and illustrated in the accompanying drawings; wherein, Figure 1 illustrates a perspective view of a form of automobile engine and section of flooring and steering column with accessory throttle control thereon.

Fig. 2 illustrates in perspective view an assembly of the several parts constituting the device.

Fig. 3 illustrates a side view of the pedal.

Referring now more in particular to the drawings, wherein the same parts throughout are designated by identical reference characters, the numeral 1 points out any form of automobile engine which is provided with a carbureter and throttle control mechanism located adjacent to the steering wheel. In this instance a steering wheel 2 is provided with a means of throttle control comprising a rod 3 with an integral hand actuating lever 4. This member 3—4 is arranged alongside the steering column 5 and adapted to be revolved through a partial revolution by manipulation of the hand lever 4 by the driver. An arm 6 is fixed upon the rod 3 and pivotally connects with a lug or pin 7ª which is integrally formed with a cuff 7 slidably confined upon a rod 8. A pin 9 is fixed in the rod 8 just forward of the cuff 7 for the purpose of limiting the travel of the cuff 7 upon the throttle control member 8. A coil tension spring 8ª is fixed to the rod and to some point on the engine for the purpose of keeping the rod in an inwardly and normally limited position. The last named member passes through the space between the cylinders of the engine and has connection with the throttle in the carbureter located on the opposite side thereof. This assembly of parts permits the control member 8 to move back and forth in sliding contact with the cuff 7 independently of the member 3—4.

A foot control device comprising a bell crank 10 integrally formed with a foot pedal 11 is pivoted upon a plate 13 by suitable bearings and passes through a slotted opening formed in the floor piece of the car. The plate upon which the pedal member is journaled is secured to the underneath side of the floor in any suitable manner, and in a position convenient to the driver that he may reach the same with his foot. A bracket 14 is secured to the base of the engine at a point in proximity to the throttle control rod 8. A bell crank 15 is pivoted upon the bracket with a bifurcated extremity 16, the forks of which lie upon either side of and between the pin 9 and the member 8. A connecting link 18 is pivotally connected with the foot pedal member and the bell crank 15 which establishes a movable control from the foot pedal to the bell crank. A turnbuckle 19 is included in the rod for the purpose of adjusting the length of said rod.

In the operation of this form of throttle accelerator the driver of the car is provided with the foot pedal 11 and hand control 4 for controlling the speed of his car, one of which is adapted to work independently of the other in such a manner that the driver can depress the foot pedal 11 causing the bell crank 15 to move along the rod 8 and come in contact with the pin 9, at which time the rod 8 moves forward causing the throttle to be opened by the regulated movement imparted to the foot pedal.

In a similar manner the driver of the car may manually operate the hand control lever 4 which will cause the arm 6 and correlated cuff 7 to move along the throttle control rod until the cuff has contacted the member 16 at which juncture the throttle control rod is again moved forward to regulate the opening of the throttle.

The elements constituting my invention are few in number and simplified in design and capable of being applied to a Ford car or other automobile in a short time, and its use makes driving the car more convenient and restful, and also gives economy to the operation of the engine since the use of the foot accelerator keeps the engine throttle to a minimum speed when the engine is not in motion.

The invention is presented to include all such changes and modifications in design and form as may come within the purview of the following claims.

Claims:

1. In a foot accelerator for controlling the throttle movement of an engine, the combination with a bell crank pivoted in some suitable position upon the engine, a throttle control rod, a foot pedal device correlated with the bell crank for the purpose of controlling same, of a cuff slidably confined upon the throttle control rod, a hand control lever arranged adjacent to the steering wheel, and a suitable connecting arm fixed upon the control lever and having pivotal connection with the cuff.

2. In a throttle accelerator, the combination with the usual hand control mounted adjacent the steering column of an automobile, of a foot throttle pedal for operation by the driver's foot, a pivoted bell-crank provided with a bifurcated extremity, a rod establishing a connection between the foot pedal and said bell-crank, a rod confined within the furcations of the bell-crank and having connection with the carbureter of the automobile engine, a stop fixed to the last named rod for the purpose of limiting its movement in one direction within the furcations of the bell-crank but which will permit it freedom of movement in the other direction, a movable member confined upon the last named rod and adapted to move into contact with the bell-crank at which time said member carries the bell-crank forward about said bell-crank's pivotal point, and a connection established between the usual hand control found on an automobile and the device herein set out for the purpose of gaining a unity of control either with the hand or the foot of the driver of the car.

In testimony whereof I hereunto affix my name.

PLEAS E. VINEYARD.